United States Patent
Hwang et al.

(10) Patent No.: US 7,565,023 B2
(45) Date of Patent: Jul. 21, 2009

(54) METHOD FOR ENCODING IMAGES ACCORDING TO OBJECT SHAPES

(75) Inventors: Yin-Tsung Hwang, Hsinchu (TW);
Kuei-Hung Cheng, Hsinchu (TW);
Shi-Shen Wang, Hsinchu (TW);
Sung-Bo Chen, Hsinchu (TW);
Guo-Zua Wu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 603 days.

(21) Appl. No.: 11/043,920

(22) Filed: Jan. 28, 2005

(65) Prior Publication Data
US 2006/0023962 A1    Feb. 2, 2006

(30) Foreign Application Priority Data
Jul. 30, 2004    (TW) .............................. 93122855 A

(51) Int. Cl.
*G06K 9/46* (2006.01)
(52) U.S. Cl. .................................................. 382/240
(58) Field of Classification Search ............. 382/240, 382/232
See application file for complete search history.

(56) References Cited
OTHER PUBLICATIONS

C. Taswell, Top-down and bottom-up tree search algorithms for selecting bases in wavelet packet transforms, and in Proc. Villard de Lans Conf., Nov. 1994, A. Antoniadis and G. Oppenheim, Ed. , ser. Lecture Notes in Statistics, New York: Springer-Verlag, vol. 103, Wavelets and Statistics, pp. 345-359, 1995.*

C. Y. Su and B. F. Wu, "A low memory zerotree coding for arbitrarily shaped objects," IEEE Trans. On Image Processing, vol. 12, No. 3, pp. 271-282, Mar. 2003.*

J. M. Shapiro, "An embedded hierarchical image coder using zerotrees of wavelet coefficients," in IEEE Data Compression Conf. Snowbird, UT, 1993, pp. 214-223.*

* cited by examiner

*Primary Examiner*—John B Strege
(74) *Attorney, Agent, or Firm*—Birch, Stewart, Kolasch & Birch, LLP

(57) ABSTRACT

A method for encoding images according to object shapes is provided. The method enables reduced usage of storage space when an image encoding system encodes a received image frame. The method uses a bottom-up and sequential approach for encoding coefficients. The coefficients in each subband are numbered using a tree structure, wherein level N subband is designated as a root of the whole tree, level (N-1) subbands are designated as roots of subtrees, and level (N=1) subbands are designated as terminal nodes of subtrees. The terminal nodes for one of the subtrees are numbered first, and then this subtree is numbered in the bottom-up sequence. After that, the terminal nodes for another subtree are numbered, and this numbering sequence continues to number all the other subtrees until the root of the tree has been numbered, so as to allow a bottom-up encoding process for the coefficient to be performed.

16 Claims, 21 Drawing Sheets

FIG. 5(C)

| No. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Coefficient Value | 1 | X | 1 | 0 | 3 | -4 | 9 | X | X | X | 3 | 5 | 13 | 1 | -8 | X | X | X | X | 7 | 21 |
| T=16(SAQ) | 0 | | 0 | 0 | 0 | 0 | 0 | | | | 0 | 0 | 0 | 0 | 0 | | | | | 0 | 1 |
| T=8(SAQ)  | 0 | | 0 | 0 | 0 | 0 | 1 | | | | 0 | 0 | 1 | 0 | 1 | | | | | 0 | 1 |
| T=4(SAQ)  | 0 | | 0 | 0 | 0 | 1 | 1 | | | | 0 | 1 | 1 | 0 | 1 | | | | | 1 | 1 |
| T=2(SAQ)  | 0 | | 0 | 0 | 1 | 1 | 1 | | | | 1 | 1 | 1 | 0 | 1 | | | | | 1 | 1 |
| T=1(SAQ)  | 1 | | 0 | 0 | 1 | 1 | 1 | | | | 1 | 1 | 1 | 1 | 1 | | | | | 1 | 1 |

FIG. 5(D)

| No. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Coefficient Value | 1 | X | 1 | 0 | 3 | important/omot | -4 | 9 | X | X | X | 3 | 5 | 13 | 1 | -8 | X | X | X | X | 7 | 21 important/omot |
| shape information | 1 | 0 | 0 | 1 | 1 | | 1 | 1 | 0 | 0 | 0 | 1 | 1 | 1 | 1 | 1 | 0 | 0 | 0 | 0 | 1 | 1 |
| symbol bit stream(T=16) | 0 | - | - | 0 | 0 | 0 | 0 | 0 | - | - | - | 0 | 0 | 0 | 0 | 0 | - | - | - | - | 0 | 0 |
| symbol bit stream(T=8)  | 0 | - | - | 0 | 0 | 1 | 0 | 10 | - | - | - | 0 | 0 | 10 | 0 | 11 | - | - | - | - | 0 | 10 |
| symbol bit stream(T=4)  | 0 | - | - | 0 | 0 | 1 | 11 | 10 | - | - | - | 0 | 10 | 10 | 0 | 11 | - | - | - | - | 10 | 10 |
| symbol bit stream(T=2)  | 0 | - | - | 0 | 10 | 1 | 11 | 10 | - | - | - | 10 | 10 | 10 | 0 | 11 | - | - | - | - | 10 | 10 |
| symbol bit stream(T=1)  | 10 | - | - | 10 | 10 | 1 | 11 | 10 | - | - | - | 10 | 10 | 10 | 10 | 11 | - | - | - | - | 10 | 10 |

FIG. 5(E)

| No. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Coefficient Value | 1 | X | X | 1 | 3 important/not | -4 | 9 | X | X | X important/not | 3 | 5 | 13 | 1 | -8 important/not | X | X | X | X | 7 important/not | 21 important/not |
| shape information | 1 | 0 | 0 | 1 | 1 | 1 | 1 | 0 | 0 | 0 | 1 | 1 | 1 | 1 | 1 | 0 | 0 | 0 | 0 | 1 | 1 |
| simplified symbol bit stream(T=16) | - | - | - | - | - | - | - | - | - | - | - | - | - | - | - | 0 | 0 | 0 | 0 | 1 | 1 |
| simplified symbol bit stream(T=8) | - | - | - | - | 0 | 0 | 0 | 10 | - | - | 0 | 0 | 10 | 0 | 11 | 1 | - | - | - | 0 | 10 |
| simplified symbol bit stream(T=4) | - | - | - | - | 0 | 0 | 11 | * | - | - | 0 | 10 | * | 0 | * | 1 | - | - | - | 10 | * |
| simplified symbol bit stream(T=2) | - | - | - | - | 10 | 0 | * | * | - | - | 10 | * | * | 0 | * | 1 | - | - | - | * | * |
| simplified symbol bit stream(T=1) | 10 | - | - | 10 | * | 1 | * | * | - | - | * | * | * | 10 | * | 1 | - | - | - | * | * |

FIG. 5(F)

| Coefficient Value | 3 | 4 | 5 | 7 | 8 | 9 | 13 | 21 |
|---|---|---|---|---|---|---|---|---|
| $2^4$ Weighing Value(T=16) | | | | | | | | 1 |
| $2^3$ Weighing Value(T=8) | | | | | 1 | 1 | 1 | 0 |
| $2^2$ Weighing Value(T=4) | | | 1 | 1 | 0 | 0 | 1 | 1 |
| $2^1$ Weighing Value(T=2) | 1 | 0 | 0 | 1 | 0 | 0 | 0 | 0 |
| $2^0$ Weighing Value(T=1) | 1 | 0 | 1 | 1 | 0 | 1 | 1 | 1 |

FIG. 5(G)

| No. | 5 | 6 | 7 | 11 | 12 | 13 | 15 | 20 | 21 |
|---|---|---|---|---|---|---|---|---|---|
| Coefficient Value | 3 | -4 | 9 | 3 | 5 | 13 | -8 | 7 | 21 |
| refinement bit stream(T=16) | | | | | | | | | 0 |
| refinement bit stream(T=8) | | | | | | 1 | 0 | 0 | 1 |
| refinement bit stream(T=4) | | | 0 | 0 | 1 | 0 | 0 | 1 | 0 |
| refinement bit stream(T=2) | 0 | 0 | 0 | 1 | 0 | 1 | 0 | 1 | 0 |
| refinement bit stream(T=1) | 1 | 0 | 1 | 1 | 1 | 1 | 0 | 1 | 1 |

| threshold value | SAQ bit value | simplified symbol bit stream | refinement bit stream |
|---|---|---|---|
| 16 | 0,0,0,0,0,0,0,0,0,0,0,0,0,0,0,1 | 100 | - |
| 8 | 0,0,0,0,0,0,1,0,0,0,0,1,0,0,0,0,1 | 00,0,10,0,0,10,0,111,00 | 0 |
| 4 | 0,0,0,0,0,1,1,0,0,0,01,1,0,1,0,0,0,1,1 | 00,11,0,10,0,1,100 | 0,1,0,1 |
| 2 | 0,0,0,1,1,1,0,0,1,1,1,0,1,0,0,0,0,1,1 | 100,10,0,1,0 | 0,0,0,0,0,1,0 |
| 1 | 1,0,1,1,1,1,1,0,0,1,1,1,1,0,0,0,0,1,1 | 10,0,1,10,1,0 | 1,0,1,1,1,0,1,1 |

FIG. 6 threshold value=16
simplified sgmbol bit stream={100}
refinement bit stream={-}
shape information bit stream={1,1,0,0,0,0,1,1,1,1,1,0,0,0,1,1,1,1,0,0,1}
decoded input of SAQ bit value={0,0,0,0,0,0,0,0,0,0,0,0,0,0,0,0,0,0,0,0}
decoded output of SAQ bit values={1,0,0,0,0,0,0,0,0,0,0,0,0,0,0,0,0,0,0,0}
reconstructed contenes :

| * | 24 | 0 | 0 | 0 | 0 | 0 | 0 |
|---|----|---|---|---|---|---|---|
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |
| 0 | 0  | 0 | 0 | 0 | 0 | 0 | 0 |

FIG. 8(A)

threshold value=8
simplified sgmbol bit stream={00,111,0,10,0,0,10,0,00}
refinement bit stream={0}
shape information bit stream={1,1,0,0,0,0,1,1,1,1,1,0,0,0,1,1,1,1,0,0,1}
decoded input of SAQ bit value={1,0,0,0,0,0,0,0,0,0,0,0,0,0,0,0,0,0,0,0,0}
decoded output of SAQ bit values={1,0,0,0,0,0,1,0,1,0,0,0,0,0,1,0,0,0,0,0,0}
reconstructed contenes :

| * | 20 | 0 | 0 | 0 | 0 | 0 | 12 |
|---|----|---|---|---|---|---|----|
| 0 | 0 | -12 | 0 | 0 | 0 | 0 | 0 |
| 0 | 0 | 0 | 0 | 0 | 0 | 0 | 0 |
| 0 | 0 | 0 | 0 | 12 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 8(B)

threshold value=4
simplified sgmbol bit stream={100,1,0,10,0,11,00}
refinement bit stream={1,0,1,0}
shape information bit stream={1,1,0,0,0,0,1,1,1,1,1,0,0,0,1,1,1,1,0,0,1}
decoded input of SAQ bit value={1,0,0,0,0,0,1,0,1,0,0,0,0,0,1,0,0,0,0,0,0}
decoded output of SAQ bit values={1,1,0,0,0,0,1,0,1,1,0,0,0,0,1,1,0,0,0,0,0}
reconstructed contenes :

| *  | 22 | 0   | 0 | 0  | 0 | -6 | 10 |
|----|----|-----|---|----|---|----|----|
| 0  | 0  | -10 | 6 | 0  | 0 | 0  | 0  |
| 0  | 0  | 0   | 0 | 0  | 6 | 0  | 0  |
| 0  | 0  | 0   | 0 | 14 | 0 | 0  | 0  |
| 0  | 0  | 0   | 0 | 0  | 0 | 0  | 0  |
| 0  | 0  | 0   | 0 | 0  | 0 | 0  | 0  |
| 0  | 0  | 0   | 0 | 0  | 0 | 0  | 0  |
| 0  | 0  | 0   | 0 | 0  | 0 | 0  | 0  |

FIG. 8(C)

threshold value=2
simplified sgmbol bit stream={0,1,0,10,100}
refinement bit stream={0,1,0,0,0,0,0,}
shape information bit stream={1,1,0,0,0,0,1,1,1,1,1,0,0,0,1,1,1,1,0,0,1}
decoded input of SAQ bit value={1,1,0,0,0,0,1,0,1,1,0,0,0,0,1,1,0,0,0,0,0}
decoded output of SAQ bit values={1,1,0,0,0,0,1,0,1,1,0,0,0,0,1,1,1,0,0,0,0,0}
reconstructed contenes :

| * | 21 | 3 | 0 | 1 | 0 | -5 | 9 |
|---|----|---|---|---|---|----|---|
| 0 | 0  | -9| 7 | 0 | 1 | 0  | 0 |
| 0 | 0  | 0 | 0 | 3 | 5 | 0  | 0 |
| 0 | 0  | 0 | 0 | 13| 0 | 0  | 0 |
| 0 | 0  | 0 | 0 | 0 | 0 | 0  | 0 |
| 0 | 0  | 0 | 0 | 0 | 0 | 0  | 0 |
| 0 | 0  | 0 | 0 | 0 | 0 | 0  | 0 |
| 0 | 0  | 0 | 0 | 0 | 0 | 0  | 0 |

FIG. 8(D)

threshold value=1
simplified sgmbol bit stream={0,1,10,1,10,10}
refinement bit stream={1,1,0,1,1,1,1,0,1}
shape information bit stream={1,1,0,0,0,0,1,1,1,1,1,0,0,0,1,1,1,1,0,0,1}
decoded input of SAQ bit value={1,1,0,0,0,0,1,0,1,1,1,0,0,0,1,1,1,0,0,0,0}
decoded output of SAQ bit values={1,1,0,0,0,0,1,1,1,1,1,0,0,0,1,1,1,1,0,0,1}
reconstructed contenes :

| *  | 21 | 3  | 0 | 1  | 0 | -4 | 9 |
|----|----|----|---|----|---|----|---|
| 0  | 0  | -8 | 7 | 0  | 1 | 0  | 0 |
| 0  | 0  | 0  | 0 | 3  | 5 | 0  | 0 |
| 0  | 0  | 0  | 0 | 13 | 0 | 0  | 0 |
| 0  | 0  | 0  | 0 | 0  | 0 | 0  | 0 |
| 0  | 0  | 0  | 0 | 0  | 0 | 0  | 0 |
| 0  | 0  | 0  | 0 | 0  | 0 | 0  | 0 |
| 0  | 0  | 0  | 0 | 0  | 0 | 0  | 0 |

FIG. 8(E)

METHOD FOR ENCODING IMAGES ACCORDING TO OBJECT SHAPES

FIELD OF THE INVENTION

The present invention relates to methods for encoding images, and more particularly, to a method for encoding images according to the shapes of image objects.

BACKGROUND OF THE INVENTION

Accompanying the rapid development and evolution of electronics, computer, network and communication technologies, image processing has been widely used in various multimedia services. Therefore, encoding and compression technologies of image data have become research areas of great importance.

Shapiro proposed the idea called Embedded Zerotree Wavelet (EZW) for image encoding in 1993, since then it has become one of the core technologies for general image encoder, and EZW technique also plays an important role in JPEG-2000.

In the method of signal decomposition used in JPEG-2000, signals are first decomposed in the parallel direction, then in the vertical direction, so that images are decomposed in two-dimension space. For example, the original image size is N×M, the image is first decomposed in the parallel direction, that is, each row of the image is passed through a filter for a down-sampling process to reduce repetition. The image size is reduced to N×M/2. Then, the image is processed in the vertical direction, that is, each column is passed through the filter to obtain an image size of N/2×M/2. Thereupon, the image has passed through two filter levels, obtaining four subband images, as shown in the subband images in FIG. 1 (A). The first subband image passed through two successive low-pass filters is normally denoted by the symbol LL, the second subband image passed through a low-pass filter first then a high-pass filter is normally denoted by the symbol LH, the third subband image passed through a high-pass filter first then a low-pass filter is normally denoted by the symbol HL, and the fourth subband image passed through two successive high pass filters is normally denoted by the symbol HH. Wherein, each subband image can again be passed through a filter for down sampling. Thus, signals are decomposed repeatedly. In FIG. 1 (B) is a graph showing commonly seen image decomposition. The LL subband image is filtered again, thus the block at the most upper left hand side indicates the lowest frequency information (i.e. indicates roughly the waveform of the signals), and the block at the lowest right hand side indicates the highest data information (i.e. indicates finer variations of the waveform). The above-mentioned signal decomposition is obtained by the conventional wavelet transform technique, so no further details will be described herein.

After the above decomposition, the blocks are scanned sequentially starting with the block on the most upper left corner, through the LL subband, HL subband, LH subband and HH subband, to the block at the lowest right corner (as indicated by the direction of the arrow in FIG. 1 (B), which is the result obtained from wavelet transform after three level decomposition), to perform image encoding.

However, when using the level-type image transmission system designed by the EZW technique to transmit images, the result of encoding is not ideal. This is because the encoder designed using the EZW technique encodes according to the resolution of the images. Encoders having different requirements for resolution and encode rate cannot share the bit stream transmitted by the encoder. Although such deficiency could be overcome by simultaneously playing technique, yet independently encoding the same image with different resolutions using this technique would make the common low pass subband being repeatedly encoded and transmitted, thus generating high redundancy.

Among the various image-encoding schemes based on the above EZW, the technique called Set Partition in Hierarchical Tree (SPIHT) proposed by Amir The and Pearlman in 1996 has higher encoding efficiency, even in high compression and low bit rate, the displayed images are still clear. Thus this technique has become the standard of new generation for image compression. Nevertheless, SPIHT technique has to establish three sequences, respectively known as "List of Insignificant Sets" (referred to as LIS hereinafter), "List of Insignificant Pixels" (referred to as LIP hereinafter) and "List of Significant Pixels" (referred to as LSP hereinafter). Therefore, SPIHT requires a large amount of memory for recording, and also raises the requirement for complex hardware computation.

Therefore, there is a need to efficiently save the memory required for image compression encoding to reduce hardware requirement and system computation complexity, while not affecting the resolution of displayed images.

SUMMARY OF THE INVENTION

In order to solve the problems of the prior art, one objective of the present invention is to provide a method for encoding image according to object shape. The shape information of objects is incorporated into the procedures of image encoding, thus eliminating the need to encode pixel values and saving memory storage space.

Another objective of the present invention is to provide a method for encoding image according to object shape. The data bit stream obtained after encoding can be applied to a progressive mode image encoding system for the purpose of achieving progressive images.

In order to achieve the above objectives, the present invention provides a method for encoding image according to object shape, which provides an image encoding system for reducing memory storage space used when encoding the received image frames. The method comprises the following steps: receiving an image frame and extracting a frame with the object shape contained in the image frame to establish object shape information, decomposing the object shape frame into N-level subbands so that each pixel in the object shape frame respectively forms a 2-D coefficient, encoding the coefficients using a bottom-up and sequential approach, that is, encoding the subbands from the lowest level, then encoding the upper subbands with predetermined coefficient according to the importance of some of the lower subband coefficients, and storing the bit stream generated after encoding for image decoding.

BRIEF DESCRIPTION OF THE DRAWINGS

The present invention can be more fully understood by reading the following detailed description of the preferred embodiments, with reference made to the accompanying drawings, wherein:

FIG. 5(C) shows encoded contents of SAQ bit values corresponding to each layer obtained according to FIGS. 3(D), 4(A), and 5(A);

FIG. 5(D) shows encoded contents of the symbol bit stream corresponding to each layer obtained according to FIGS. 3(D), 4(B), 4(C) and 5(A);

FIG. 5(E) shows encoded contents of the symbol bit stream after simplification obtained according to FIGS. 3(D), 4(D), and 5(D);

FIG. 5(F) shows the weighing values for the important coefficient at the corresponding threshold layer obtained in such a way so that the sum of the products of the weighing values and the corresponding threshold values equals the coefficient value of the corresponding important bit;

FIG. 5(G) shows the refinement values in the symbol bit stream for each threshold layer;

FIG. 6 shows the SAQ bit vales, the simplified symbol bit stream and the refinement bit stream obtained from the method of image encoding according to object shape of the present invention;

FIGS. 8(A) to 8(E) show the reconstruction results obtained after the encoded contents, for threshold values 16 through to 1, were decoded.

DETAILED DESCRIPTION OF THE PREFFERED EMBODIMENT

Figure 1A:
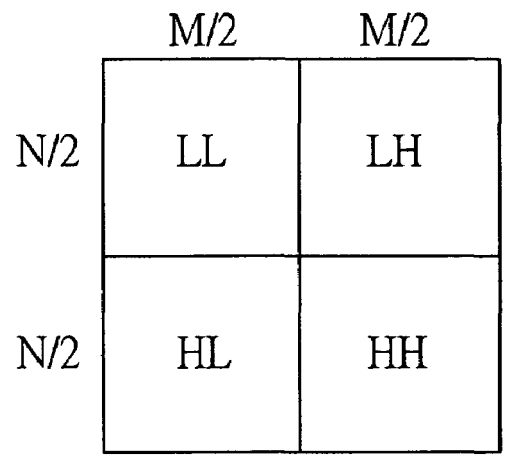
FIG. 1(A) (PRIOR ART) shows a conventional image decomposition of subbands into LL, LH, HH, and HL subbands.
Figure 1B:
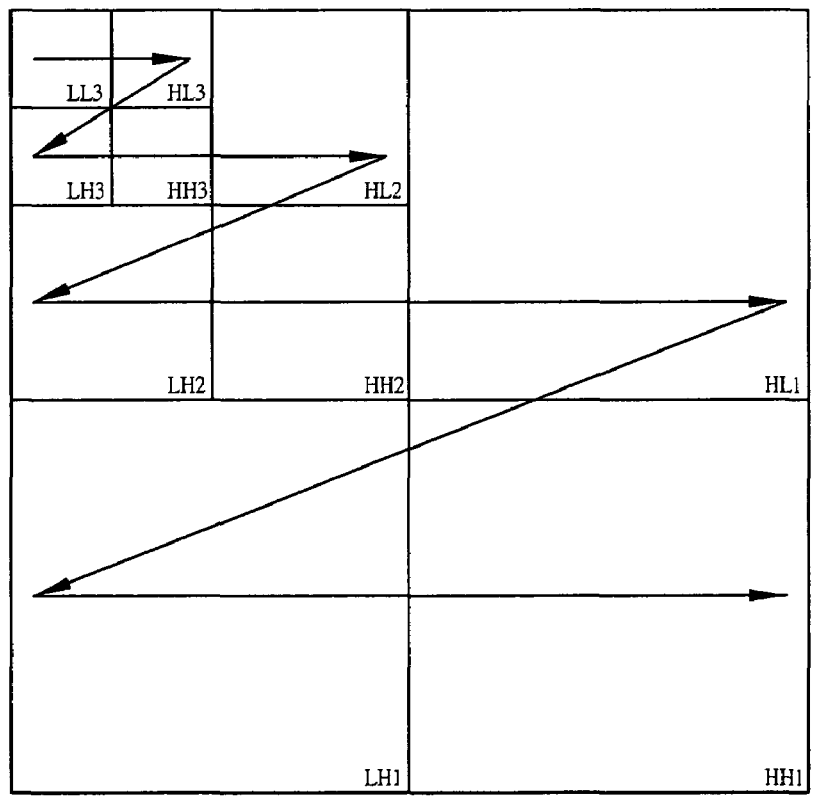
FIG. 1(B) (PRIOR ART) shows a scanning sequence of subbands of an image for a conventional image encoding method.
Figure 2:
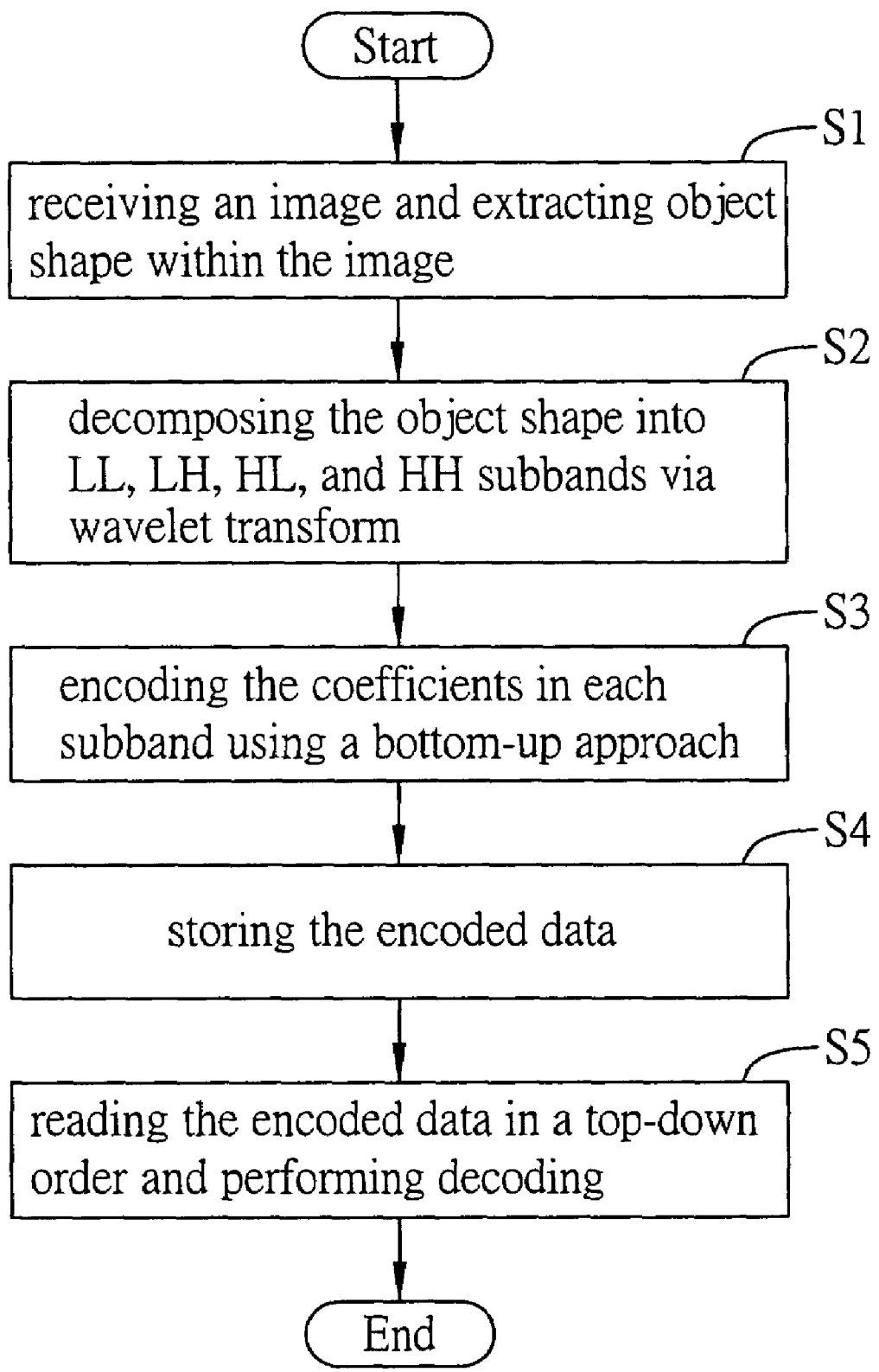
FIG. 2 shows a flow diagram for a method of image encoding according to object shape of the present invention.

FIG. 2 shows the flow diagram of a method for encoding image according to object shapes of the present invention. The method of image encoding according to object shapes of the present invention is applicable to progressive mode image encoding system (not shown). The information relating to object shapes is incorporated into the procedures of image encoding, thus eliminating the need to encode pixel values and saving memory storage space.

As shown in FIG. 2, in step S1, the image encoding system receives an image frame and extracts the object shape contained in the image frame. An image frame is shown in FIG. 3 (A) and the object shape in the image frame of FIG. 3 (A) is shown in FIG. 3 (B). That is, segmentation is performed on the object and background in the image frame, to establish shape information of the object. Then proceeds to step S2. The segmentation of image object and background is a convention image processing technique and thus will not be further described herein.

In step S2, the object shape frame obtained in step S1 is decomposed into LL, LH, HL, and HH subbands by wavelet transformation. The following embodiments will all be illustrated with three-level wavelet transformation, that is, the object shape frame is decomposed into HH grandchild-level subband 10, HH child-level subband 100, HH parent-level subband 101, HL grandchild-level subband 11, HL child-level subband 110, HL parent-level subband 111, LH grandchild-level subband 12, LH child-level subband 120, LH parent-level subband 121, and LL grandchild-level subband 13, LL child-level subband 130, LL parent-level subband 131, as shown in FIG. 3 (C). After wavelet transforming the object shape frame, each pixel within the object shape frame respectively forms a 2-D coefficient as shown in FIG. 3 (D) (the 2-D coefficient is obtained using conventional discrete cosine transform and will not be further described herein). Symbol X means ignoring this coefficient and no encoding is required when, for example, this coefficient is located outside the object shape. The encoding method is the same for the HL subbands, the LH subbands and the HH subbands, and they are independent from each other, and therefore the following embodiment will only be illustrated using the HL subbands for simplicity, as indicated by the bold frame in FIG. 3 (D) (that is, HL grandchild-level subband 11, the HL child-level subband 110, and the HL parent-level subband 111). Then proceeds to step S3.

In step S3, a bottom-up approach is taken for encoding the coefficients of the HL subbands. The approach will be described later in details. Then proceeds to step S4.

In step S4, data storage unit (not shown herein), such as a stack, a queue, or a register, is established to store the data obtained by step S3 in the data storage unit. The data obtained in step S3 comprises shape information bit stream, successive approximation quantization (SAQ) bit value, simplified symbol bit stream, and refined bit stream. Then proceeds to step S5.

In step S5, decoding is performed in a top-down approach to the data stored in the data storage unit to reconstruct the 2-D coefficients in the object shape frame.

Figure 4A:
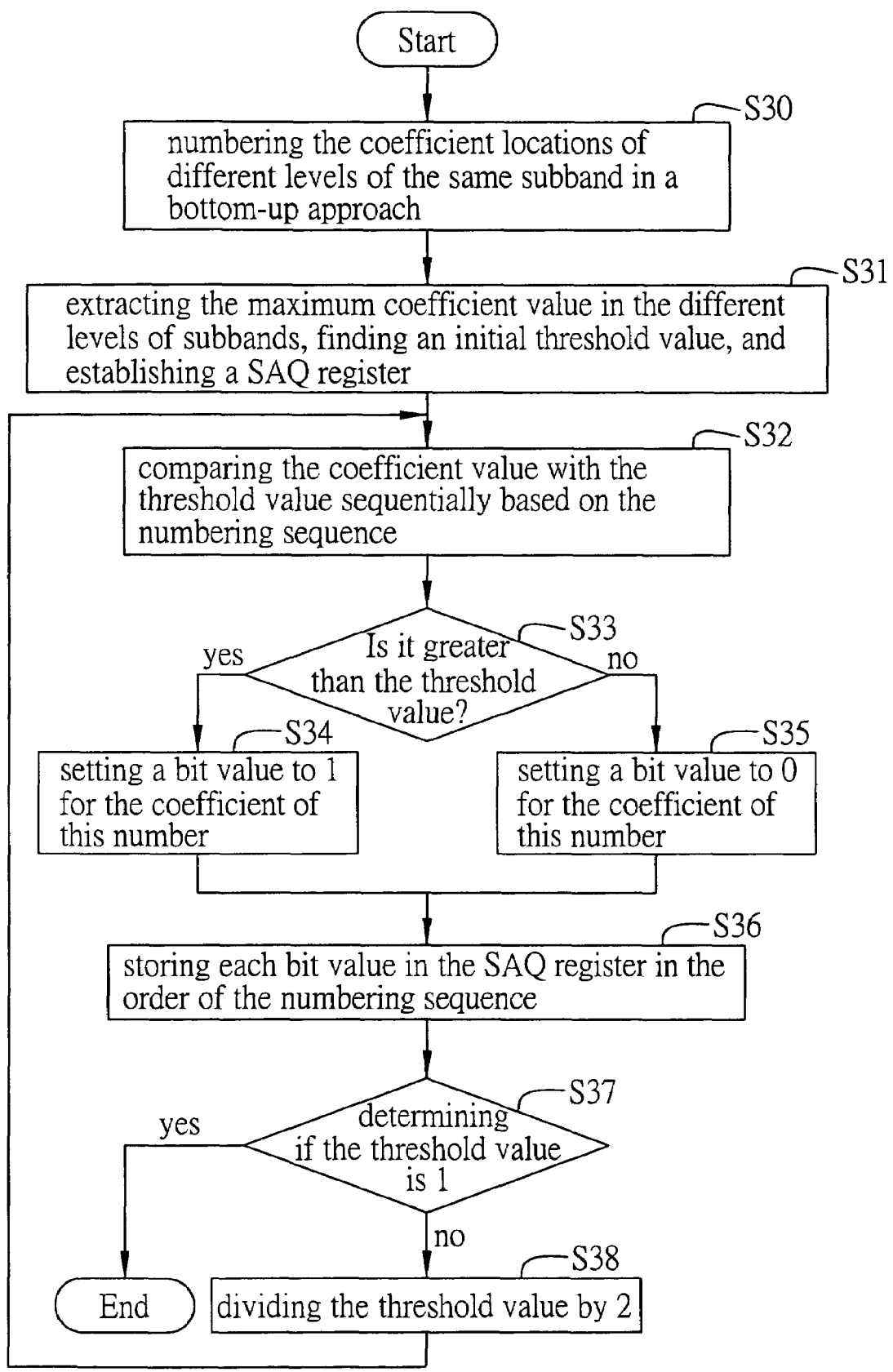
FIG. 4(A) is a flow diagram for obtaining SAQ bit values using the method of image encoding according to object shape of the present invention.
Figure 4B:
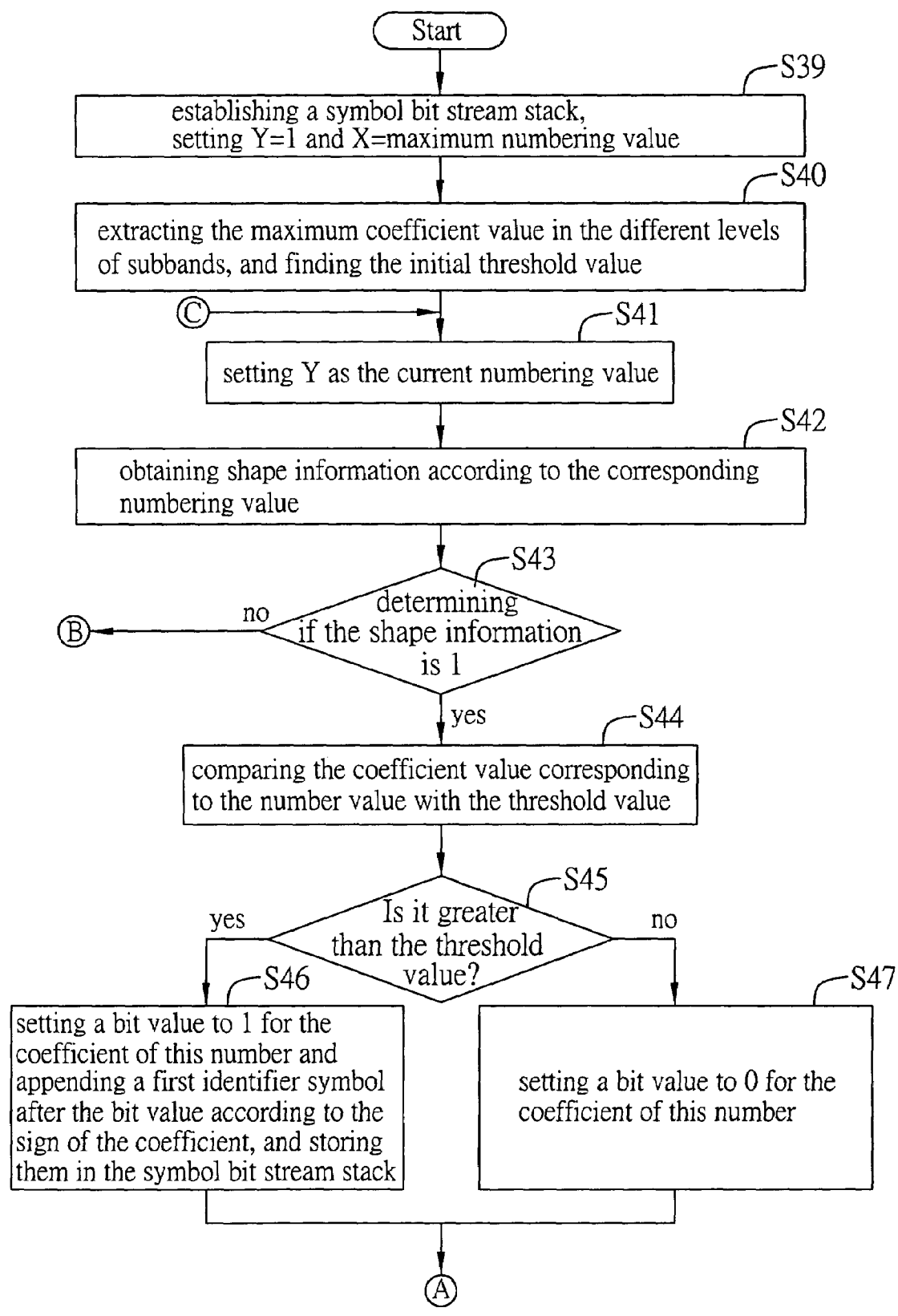
FIGS. 4(B) and 4(C) are flow diagrams for extracting symbol bit stream using the method of image encoding according to object shape of the present invention.
Figure 4C:
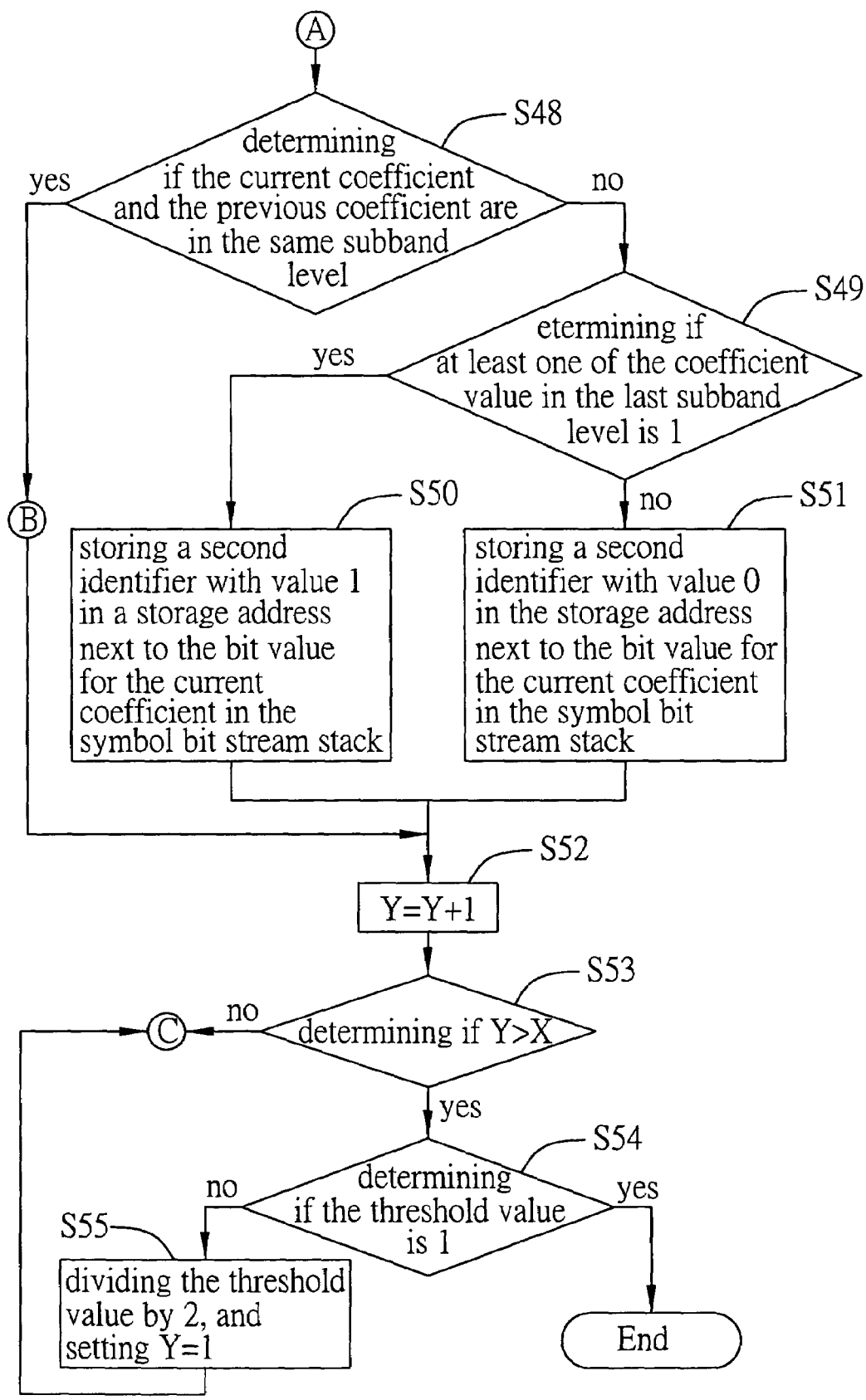
Figure 4D:
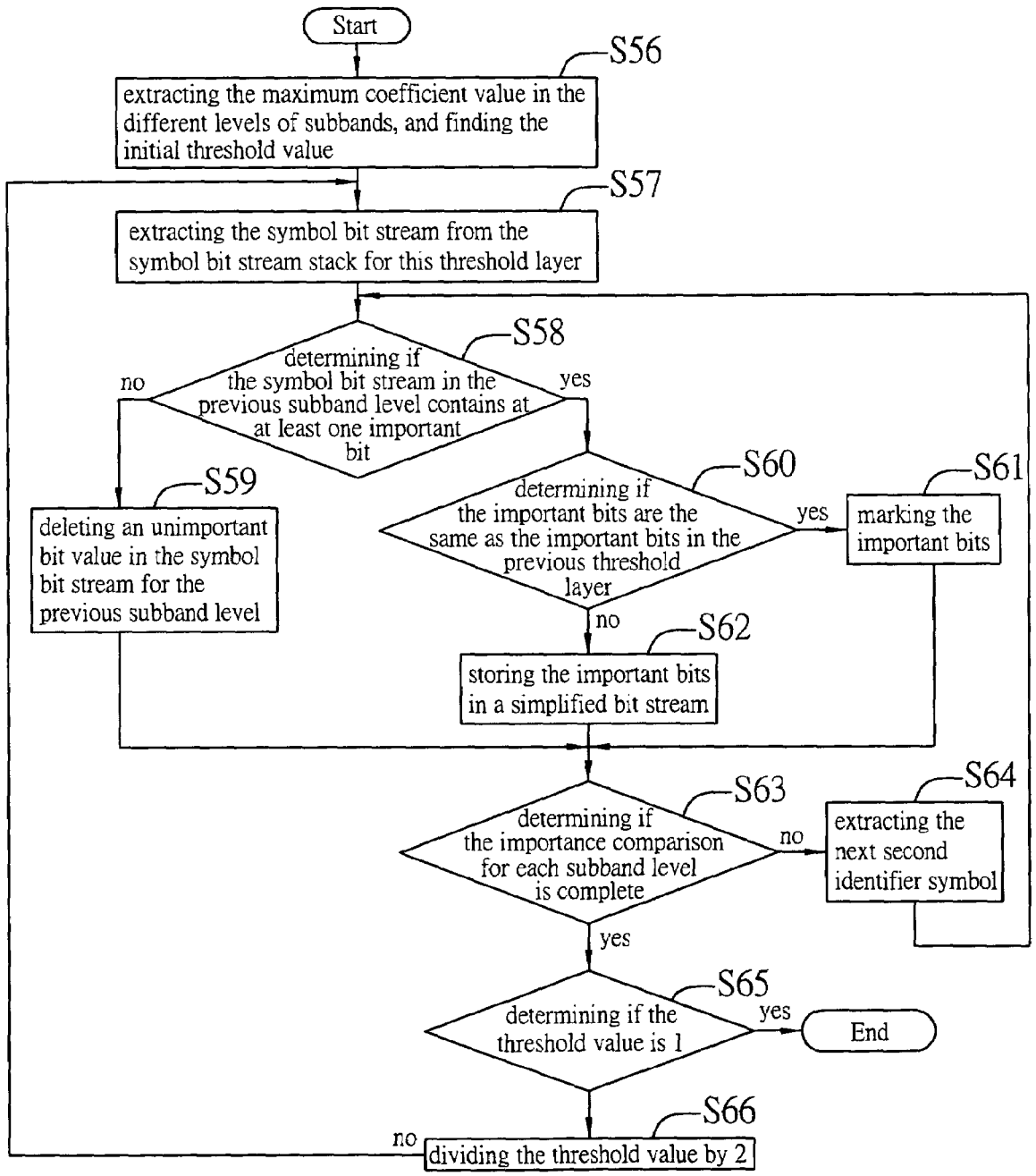
FIG. 4(D) is a flow diagram for simplifying the symbol bit stream using the method of image encoding according to object shape of the present invention.
Figure 4E:
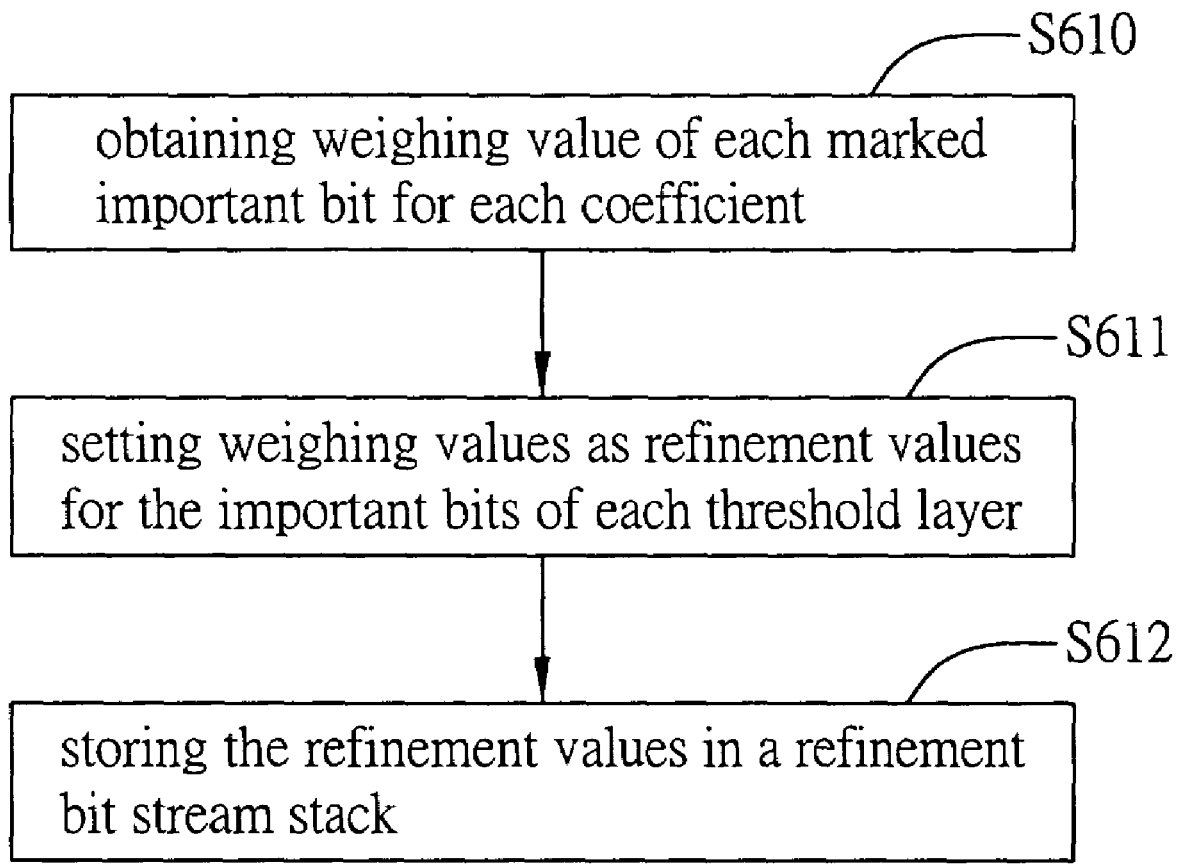
FIG. 4(E) is a flow diagram for refinement value extraction process shown in FIG. 4(D)
Figures 5A, 5B:
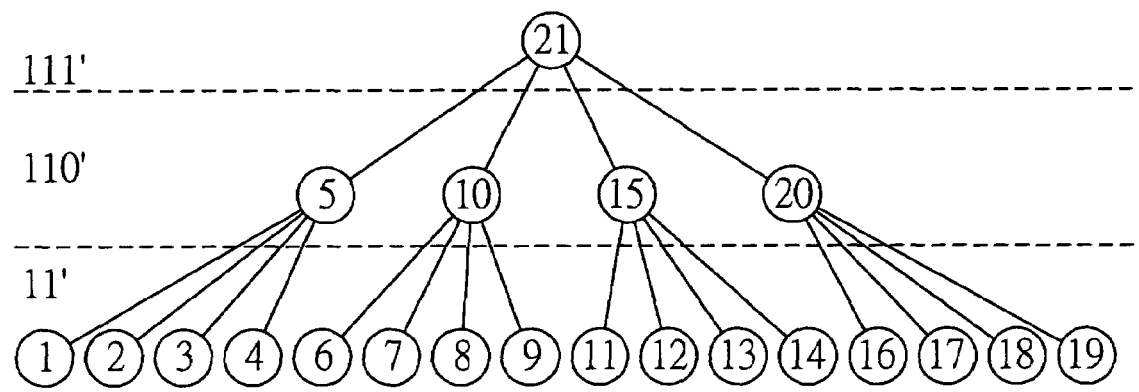
FIG. 5(A) is a diagram showing the result after numbering in sequence the coefficient locations for the HL subbands using the method of image encoding according to object shape of the present invention.
FIG. 5(B) shows the tree structure for coefficient numbering sequence using the method of image encoding according to object shape of the present invention.

To further understand the encoding process of the present invention, the flow diagrams of FIG. 4(A) to FIG. 4(E) are illustrated in details as followed. FIG. 4(A) illustrates the steps for obtaining the SAQ bit value using the method of processing encoding images according to object shapes of the present invention. Firstly in step S30, after each pixel in the object shape frame is decomposed by wavelet transform as illustrated in step S2 in FIG. 2 to form the 2-D coefficient, the coefficient positions for the same subbands (i.e. the HL subbands for illustration purpose) in different levels are numbered in a bottom-up and sequential approach. As shown in FIG. 5 (A), coefficient positions in a block of the HL grandchild-level subband 11' are firstly numbered, then a coefficient position in the HL child-level subband 110' is numbered. This coefficient in the HL child-subband 110' is the parent node of the block coefficients (i.e. numbered as 1, 2, 3, and 4) in the HL grandchild-level subband 11'. Then, another block coefficient positions in the HL grandchild-level subband 11' are numbered, followed by numbering of another coefficient in the HL child-level subband 110'. The coefficient in the HL parent-level subband 111' is numbered only after all the coefficient positions are numbered in the HL grandchild-level subband 111'. As shown in a tree diagram of FIG. 5(B), subband coefficients in each level are numbered and arranged in a tree structure, the third level subband coefficient is designated as the root, the second level subband coefficients are designated as the roots for several subtrees, the first level subband coefficients are the terminal nodes for each subtree. The terminal nodes of the subtrees are numbered first, and after the root of one subtree has finished numbering, then the terminal nodes of another subtree are numbered in sequence, until all the roots of the tree are numbered. Accordingly, the bottom-up and sequential coefficient encoding can be performed using this numbering order. It can be seen that the method for encoding image according to object shape of the present invention encodes the coefficients in the order as arranged by the tree structure, that is, encoding each coefficient in a bottom-up approach. Then proceeds to step S31.

Figure 3A:
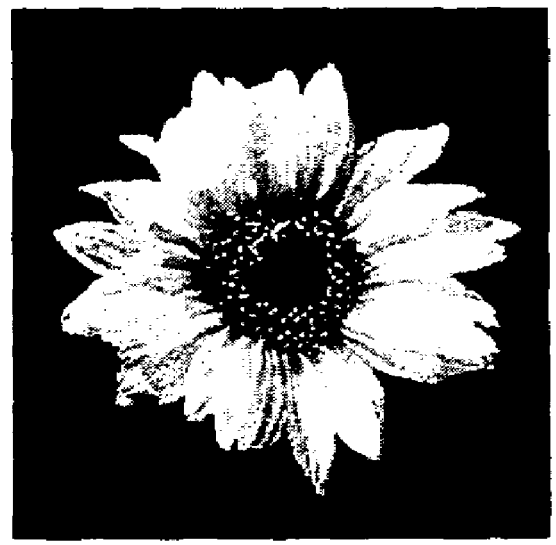
FIG. 3(A) shows an image frame.
Figure 3B:
FIG. 3(B) shows the object shape in the image frame of FIG. 3(A)
Figure 3C:
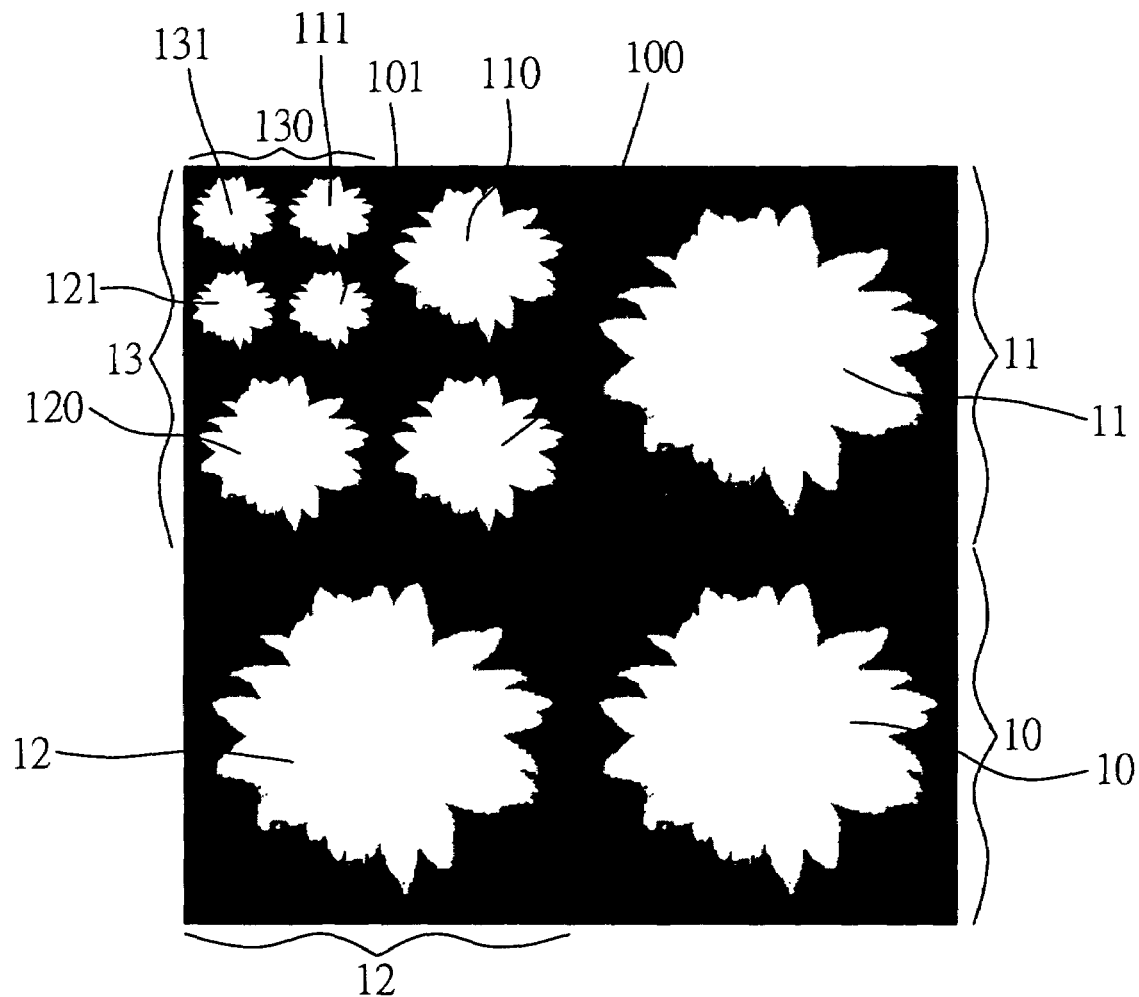
FIG. 3(C) shows the arrangement of image subbands with different levels decomposed from the object shape of FIG. 3(B)
Figure 3D:
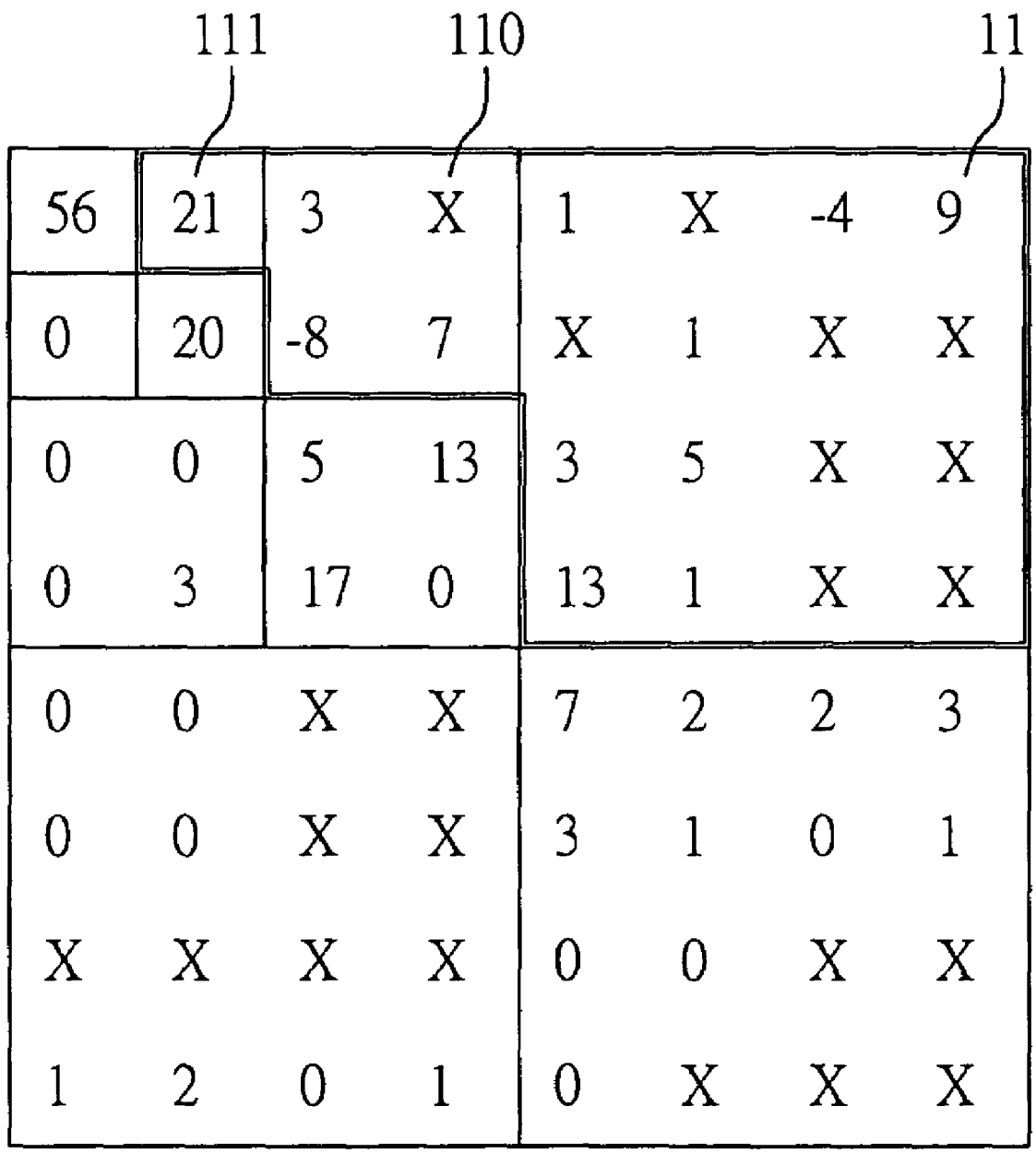
FIG. 3(D) shows 2-D coefficients obtained after performing wavelet transform to pixels corresponding to object shape shown in FIG. 3(C)

In step S31, a maximum coefficient value is extracted from the HL subbands (that is the HL grandchild-level subband 11, the HL child-level subband 110, and the HL parent-level subband 111 in FIG. 3(D)) to find an initial threshold value, and a successive approximation quantization (SAQ) register is established, then proceeds to step S32.

In step S32, according to the numbering from small to large, the coefficient value corresponding to a particular number is sequentially extracted to compare with the threshold value, then proceeds to S33.

In step S33, whether the coefficient value found is larger than the threshold value is determined, if the coefficient value is larger, then proceeds to step S34; else proceeds to step S35.

In step S34, the bit value of this coefficient corresponding to the number is set to 1, then proceeds to step S36.

In step S35, the bit value of this coefficient corresponding to the number is set to 0, then proceeds to step S36.

In step S36, the bit value set for each coefficient according to the order of numbering is stored in the SAQ register, then proceeds to step S37.

In step S37, whether the threshold value is 1 is determined, if yes, then ends the SAQ bit value acquiring process; if not, then proceeds to step S38 to divide the threshold value by 2, and returns to step S32 to repeat the steps from S32 to S37, thereby an initial encoding procedure for every layer is performed.

FIG. 5 (C) shows the encoding contents of the SAQ bit values corresponding to each layer obtained from the examples shown in FIGS. 3 (D) and 5(A), and the SAQ bit value extraction procedures shown in FIG. 5(A). The maximum coefficient value for this embodiment is 21, so the initial threshold value is 16, and 5 layers of SAQ bit values can be obtained (i.e. with threshold values 16, 8, 4, 2, and 1), wherein, the symbol T in FIG. 5 (*c*) represents the threshold values.

After the SAQ values are obtained by the method of image encoding according to the object shape of the present invention, symbol bits are obtained according to the coefficient values. FIGS. 4(B) and 4(C) illustrate the flow of symbol bit stream extraction. In step S39, a symbol bit stream stack is established, and a variable Y is set to 1 and a variable X is set to the maximum numbering value (this numbering value is obtained from the numbering result of FIG. 3(D), i.e. the maximum number is 21 in FIG. 3 (D)). Then proceeds to step S40.

In step S40, a maximum coefficient value is extracted from the HL subbands (that is the HL grandchild-level subband 11, the HL child-level subband 110, and the HL parent-level subband 111 in FIG. 3(D)) to find an initial threshold value, then proceeds to step S41.

In step S41, the value of the variable Y is used as the current numbering value, then proceeds to step S42.

In step S42, the shape information according to the number value is obtained, wherein, a shape information bit stream can be obtained through the segmentation process of image background and object, based on the coefficient values in FIG. 3 (D) and the numbering values in FIG. 5(A) for each level of the HL subbands. According to the numbering order for each level of the HL subbands, the shape information bit stream is 100111100011111000011. Bit value of 0 indicates ignoring this coefficient, for example, when this coefficient is located outside the object shape, the bit value of the shape information is 0. Thus, the current value of the variable Y is used as the numbering order to find the shape information corresponding to this numbering value. Then proceeds to step S43.

In step S43, whether the shape information obtained is a bit value 1 is determined, if so, then proceeds to step S44; or else proceeds to step S52 in FIG. 4(C).

In step S44, the coefficient value obtained based on the current numbering is compared with the threshold value, then proceeds to step S45.

In step S45, whether the coefficient value obtained according to the numbering is greater than the threshold value is determined, if so, proceeds to step S46; or else proceeds to step S47.

In step S46, the bit value of the coefficient corresponding to the numbering is set to 1, and a first identifier is appended to the bit value according to the sign of the coefficient value, wherein, when the first identifier is 0, indicating the coefficient value is positive, and when the first identifier is 1, indicating the coefficient value is negative. The bit value of the first identifier is stored in the symbol bit stream stack. Then proceeds to step S48 in FIG. 4(C).

In step S47, the bit value of the coefficient corresponding to the numbering is set to 0, then proceeds to step S48 in FIG. 4(C).

In step S48 shown in the FIG. 4(C), whether the current coefficient and the previous coefficient belongs to the same level of subband is determined (i.e. whether two adjacent numberings to which the coefficients respectively correspond belong to the same HL grandchild subband 11, the HL child subband 110 or the HL parent subband 111). If so, proceeds to S52, or else proceeds to step S49.

In step S49, upon determining that the current coefficient and the previous coefficient are not in the same subband level, whether there is any SAQ bit value in the preceding level that equals to 1 is determined, if there is, proceeds to S50, else proceeds to step S51.

In step S50, upon determining that there is one or more SAQ bit values in the preceding level that equals to 1, meaning the coefficients these SAQ bit values correspond to are important. Thus, a second identifier symbol with a value 1 is stored at the storage address next to the position of the bit value in the symbol bit stream stack corresponding to the current coefficient. Then proceeds to step S52.

In step S51, since none of the SAQ bit values in the preceding level is 1, meaning all the coefficients in the preceding level are unimportant. Thus, a second identifier symbol with a value 0 is stored at the storage address next to the position of the bit value in the symbol bit stream stack corresponding to the current coefficient. Then proceeds to step S52.

In step S52, the value of variable Y is incremented by 1, then proceeds to step S53.

In step S53, whether the value of variable Y is greater than the value of variable X is determined, which is used to determine whether all the coefficients on different levels of HL subbands have completed the symbol bit identification. If the variable Y is greater than X, proceeds to step S54, else returns to step S41 in FIG. 4(B) to continue the symbol bit identification process of the coefficients in this layer.

In step S54, whether the threshold value is 1 is determined. If so, the symbol bit stream extraction process is ended, else, proceeds to step S55, whereby the threshold value is divided by 2 and the variable is set to 1, and returns to step S41 in FIG. 4(B), for continuing the symbol bit identification process of the coefficients in the next layer.

FIG. 5 (D) illustrates the encoding contents of the symbol bit stream corresponding to each layer obtained from the above FIGS. 3 (D), 4(B), 4(C), and 5 (A). Since the maximum coefficient value is 21 in this embodiment, the initial threshold value is 16, and 5 layers of the symbol bit stream can be obtained. Wherein, symbol T in FIG. 5 (D) indicates the threshold value. In the symbol bit stream, the importance of each coefficient is identified (i.e. bit value of 0 indicates an unimportant coefficient, and bit value of 1 indicates an important coefficient). Also, the positive/negative sign of the important coefficient can be known (i.e. 11 represents an important coefficient with a negative value, 10 represents an important coefficient with a positive value) by looking at the first identifier described in step S46 of FIG. 4(B). In addition, since the method of image encoding according to object shape of the present invention uses a bottom-up and block-scanning approach to number the coefficient locations in the same subband (HL subband is used in this embodiment for illustration) with different levels, thus whether the coefficients in the preceding block are important or not can be identified. In this embodiment, bit value 1 indicates important and bit value 0 indicates not important. Thereupon, some of the unimportant bit values 0 can be deleted (details will be given later), to achieve the objective of saving memory storage space.

After obtaining the symbol bit stream, a simplifying procedure is taken for the symbol bit stream for the purpose of saving memory storage space. FIGS. 4(D) and 4(E) illustrate the flow for a symbol bit stream simplifying process. In step S56, a maximum coefficient value is extracted from the HL subbands (that is the HL grandchild-level subband 11, the HL child-level subband 110, and the HL parent-level subband 111 in FIG. 3(D)) to determine an initial threshold value, then proceeds to step S57.

In step S57, the symbol bits stream belonging to the current threshold value is extracted, then proceeds to step S58.

In step S58, whether the symbol bits in the previous level contain important bit is determined, that is, the second identifier in the symbol bit stream in each level of subbands is used for identification (in this embodiment, the second identifier with a value 1 indicates the previous subband is important). If an important bit in the previous subband is identified, proceeds to step S60; or else, proceeds to S59.

In step S59, since the symbol bit stream in the previous subband does not contain any important bit, thus the symbol bit values indicating unimportant symbol bit stream in the previous subband are deleted, thereby simplifying the number of bits occupied in the symbol bit stream. This in turns reduces the memory space required. Next proceeds to step S63.

In step S60, since the symbol bit stream in the previous subband contains at least one important bit, thus whether this important bit is the same as the important bit in the previous threshold layer corresponding to the same coefficient is determined. If they are the same, proceeds to step S61; or else, proceeds to step S62.

In step S61, upon determining that the important bit in the previous level is the same as the important bit in the previous layer corresponding to the same coefficient, marking the important bit so that subsequently a refinement process can be performed to the marked important (for details refer to FIG. 4(E)), then proceeds to step S63.

In step S62, upon determining that the important bit in the previous level is not the same as the important bit in the previous layer corresponding to the same coefficient, storing this important bit in a simplified symbol bit stream, the proceeds to step S63.

In step S63, whether the bits in each level in the symbol bit stream of this layer have completed importance comparison, if so, proceeds to step S65; or else, proceeds to step S64.

In step S64, the next second identifier is extracted from the symbol bit stream, and then returns to step S58 above to continue the importance comparison for the bits in each level of the symbol bit stream of this threshold layer, until all the bits in each level of the symbol bit stream of this threshold layer.

In step S65, the current threshold value is divided by 2, in order to determine the importance of the bits in the symbol bit stream of the next threshold layer. Then, proceeds to step S66.

In step S66, whether the current threshold value is 1 is determined. If so, the symbol bit stream simplifying process is completed; else, returns back to step S57 for continuing the symbol bit stream simplification process for the next layer.

From the process shown in FIG. 4(D), a simplified symbol bit stream can be obtained, as illustrated in FIG. 5(E). The remaining bits are the important bits, the bits for child-level coefficients connecting the bits for grandchild-level coefficients, and the second identifier for identifying the importance of bits at the grandchild-level. Wherein, if the child-level coefficient is outside the object shape so that the bit value representing the child-level coefficient is 0 (such as those indicated by symbol "X" in this embodiment), then the second identifier used for identifying the importance of the bits in the grandchild-level located next to the bit value of the child-level coefficient does not exist either. In addition, the symbol * indicates a coefficient requiring refinement.

FIG. 4(E) further illustrates the refinement value extraction process of step S61 in above-mentioned FIG. 4(D). As shown in FIG. 4(E), firstly step S610 is performed to obtain the coefficient value corresponding to the important bit of this threshold layer, then proceeds to step S611.

In step S611, the weighing values for the important coefficient at the corresponding threshold layer are obtained in such a way so that the sum of the respective products of the available threshold values and the corresponding weighing values equals to the coefficient value of the corresponding important bit. In FIG. 5(F), the weighing values at corresponding layers of threshold value are calculated as indicated by the square frame. For illustration, the sum (1×1+2×1) of the respective products of the available threshold values (T=1 and 2) and the corresponding weighing values (1 and 1) has to equal to the coefficient value 3. Then proceeds to step S612.

In step S612, these weighing values are designated as the refinement values for the important bits of the layers of the threshold values, then proceeds to step S613.

In step S613, the refinement values of the symbol bit stream for the layers of the threshold values are stored in the refinement bit stream stack. The refinement values of each symbol bit stream for each threshold layer are shown in FIG. 5(G).

After going through the processes described above, the method of image encoding according to object shape of the present invention can obtain the SAQ bit values, the simplified symbol bit stream and the refinement bit stream, as shown in FIG. 6. Therefore, the method of image encoding according to the object shape can encode the image frame, while reduce the number of bits of a data bit stream to in turns reduce the memory storage space.

Figures 7A, 7B:
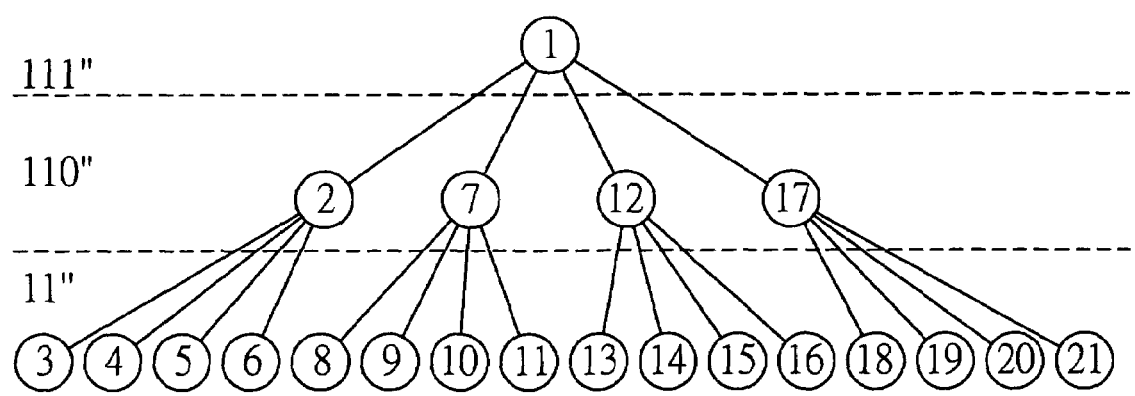
FIGS. 7(A) and 7(B) show the numbering sequence of locations of the coefficients in the HL subbands for performing decoding using the method of image encoding according to object shape of the present invention.

In order to verify the feasibility of the method according to the present invention, the decoding process for image data encoded by the method of image encoding according to the present invention will be described. Since the coefficient locations are numbered using a tree structure and bottom-up approach, thus the data stored in the data storage unit are decoded using the tree structure in a top-down approach, to reconstruct the 2-D coefficients in the object shape frame. The decoding of the coefficients is shown in FIGS. 7(A) and 7(B).

FIGS. 8(A) to 8(E) show the reconstruction results after decoding the encoded contents at the threshold values from 16 to 1. The decoding process will be explained with respect to the threshold value of 8 for simplicity, decoding processes for other threshold values are omitted.

FIG. 8(B) shows the reconstruction result after decoding the encoded contents at the threshold value of 8. Since the shape information bit stream, the SAQ bit values, the simplified symbol bit stream and the refinement value were previously stored in the stack that has the characteristics of First In Last Out (FILO), so the displayed bit values of each bit stream is in the reverse order of the bit values for encoding process. Thus, the progressive mode image can be achieved. Furthermore, as shown in FIG. 8(B), the decoded output bit values for the SAQ bit values represent the encoded contents at the threshold value of 8, and the decoded input bit values for the SAQ bit values represent the encoded contents at the threshold value of 16. From the decoded output bit values for the SAQ bit values 100000101000001000000, it can be noticed that numbers 1, 7, 9, and 15 all contain the important bits. The coefficient for the first decoding number is [24−(threshold value×½)]=20, wherein, the minus sign is the result of refinement bit stream equals 0, the value 24 comes from the construction result after decoding the encoded contents at the threshold value of 16. The coefficients of the numbers 7, 9, and 15 are 12 (threshold value×1.5), wherein, since the second set of the simplified symbol bit stream is 111, and the second bit (i.e. the first identifier symbol) is 1, indicating that the important coefficient for the second decoding number is negative, i.e. number 7 is a negative coefficient −12.

The incorporated refinement bit stream can be used as a reference for adjustment at the image decoding side, realizing a constructed image that is even more similar to the original.

As can be noticed from the above description, the method of image encoding according to object shape of the present invention utilizes the bottom-up tree structure encoding approach and the scanning order according to subtree levels, and refers to the shape information. Therefore, a large amount of memory for recording the encoding process data in LIS, LIP and LSP tables required in the conventional SPIHT technique can be improved. While at the same time, encoding coefficients outside the object can be avoided, which greatly enhances the encoding rate.

The embodiments above are only to illustrate aspects of the present invention; it should not be construed as a limitation of the scope of the present invention in any way. For example, value 0 can be used to identify an important coefficient, and value 0 can be used to indicate a negative coefficient instead of the value 1. In addition, value 0 can be used for the second identifier to identify whether or not the coefficient in the preceding level of subband is important, instead of the value 1. Furthermore, the encoded data generated by the method of the present invention can be stored in a storage unit such as a queue or a register instead of the stack, depending on the application.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for encoding images according to object shapes, for providing reduced usage of storage space when an image encoding system encodes a received image frame, the method comprising the steps of:
   (1) receiving the image frame and extracting shape information of an object contained in the image frame to establish an object shape frame;
   (2) decomposing the object shape frame into N levels of subbands, so as to form each pixel in the object shape frame into a two-dimensional coefficient;
   (3) encoding coefficients in a bottom-up manner and in sequential order by starting from the lowest-level subbands, and encoding predetermined coefficients in the upper levels of subbands based on importance of coefficients in the lower levels of subbands, wherein the sequential order means arranging coefficients in different levels of the same subband from lower level to upper level according to a first-child-then-parent principle; and
   (4) storing a bit stream generated after the encoding process.

2. The method of claim 1, wherein the object shape frame in the step (1) is established by performing segmentation to the object and background in the image frame.

3. The method of claim 1, before the step (3), further comprising the step of numbering coefficients in the subbands by means of a tree structure, wherein the coefficient in the subband of level N is designated as a root of tree, the coefficients in the subbands of level (N-1) are designated as roots of subtrees respectively, and the coefficients in the subbands of level (N=1) are designated as terminal nodes of the subtrees respectively, and wherein the terminal nodes of one of the subtrees are firstly numbered, and then the root of the subtree is numbered in the bottom-up manner, and after that, the terminal nodes and then the root of another subtree are numbered, allowing the numbering sequence to continue to number all the other subtrees until the root of tree has been numbered.

4. The method of claim 3, wherein the encoding process in the step (3) further comprises the step of extracting a first data bit stream, the extracting process comprising the steps of:
   (3-1) extracting a maximum coefficient value in each of the subbands to determine an initial threshold value according to the maximum coefficient value;
   (3-2) extracting the coefficient values corresponding to numbering values for each of the subbands according to the numbering sequence in the tree structure, and comparing each of the extracted coefficient values with the threshold value, if the coefficient value is greater than the threshold value, setting a first bit value for the coefficient corresponding to the numbering value, or if the coefficient value is smaller than the threshold value, setting a second bit value for the coefficient corresponding to the numbering value;

(3-3) storing the first bit values set for the coefficients in the numbering sequence into a first data bit stream data storage unit; and (3-4) determining whether the threshold value is 1, if yes, ending the extracting process of the first data bit stream; if no, dividing the threshold value by 2, and returning to the step (3-2).

5. The method of claim 4, wherein the encoding process in the step (3) further comprises extracting a second data bit stream, the extracting process comprising the steps of:

(3A-1) establishing a second data bit stream data storage unit, setting a first variable value to 1, and setting a second variable value to a maximum numbering value obtained via the numbering step;

(3A-2) extracting a maximum coefficient value in each of the subbands to determine an initial threshold value according to the maximum coefficient value;

(3A-3) setting the first variable value as a numbering value and extracting the coefficient according to the numbering value;

(3A-4) comparing the extracted coefficient value with the threshold value, if the coefficient value is larger than the threshold value, setting an important bit value for the coefficient corresponding to the numbering value, appending a first identifier symbol to the important bit value based on a positive/negative sign of the coefficient value, and storing the important bit value with the first identifier symbol in the second data bit stream data storage unit;

or if the coefficient value is smaller than the threshold value, setting an unimportant bit value for the coefficient corresponding to the numbering value;

(3A-5) determining whether the coefficient is in the same level of the tree structure as a previous coefficient, if yes, adding the first variable value by 1 and proceeding to step (3A-7); if no, determining whether the coefficient for a node of the tree level contains an important bit value, if containing the important bit value, storing a second identifier symbol in a storage address of the second data bit stream data storage unit for identifying the importance of the coefficient, or if not containing the important bit value, storing a third identifier symbol in the storage address of the second data bit stream data storage unit for identifying the importance of the coefficient;

(3A-6) adding the first variable value by 1; and (3A-7) determining whether the first variable value is larger than the second variable value, if no, returning to the step (3A-3) to continue the process of extracting the second data bit stream for the rest of coefficients; if yes, determining whether the threshold value is 1, if it is 1, completing the process of extracting the second data bit stream, or if the threshold value is not 1, dividing the threshold value by 2 and setting the first variable value to 1, and returning to the step (3A-3).

6. The method of claim 5, wherein the process of extracting the second data bit stream further comprises a simplification process that comprises the steps of:

(3B-1) extracting a maximum coefficient value in each of the subbands to determine an initial threshold value according to the maximum coefficient value;

(3B-2) extracting a second data bit stream corresponding to the threshold value from the second data bit stream data storage unit;

(3B-3) determining whether a second or third identifier symbol is present in the second data bit stream, if the second identifier symbol is present in the second data bit stream, determining whether an important bit of a node in the tree structure corresponding to the second identifier symbol of the second data bit stream is the same as an important bit for a previous threshold value, if they are the same, proceeding to step (3B-4), or else proceeding to step (3B-5); if the third identifier symbol is present in the second data bit stream, deleting an unimportant bit value of a node in the tree structure corresponding to the third identifier symbol, and proceeding to step (3B-6);

(3B-4) marking the important bit of the node corresponding to the second identifier symbol, and storing the marked important bit in a third data bit stream, then proceeding to step (3B-6);

(3B-5) storing the important bit in the third data bit stream, then proceeding to step (3B-6);

(3B-6) extracting a next identifier symbol from the second data bit stream, and returning to the step (3B-3) to continue comparison of importance for bits of the rest of nodes in the second data bit stream corresponding to the threshold value, then proceeding to step (3B-7); and (3B-7) determining whether the threshold value is 1, if yes, ending the simplification process of the second data bit stream; if no, dividing the threshold value by 2 and returning to the step (3B-3) to continue the simplification process.

7. The method of claim 6, further comprising a refinement process for the marked important bits stored in the third data bit stream, the refinement process comprising the steps of:

(3C-1) obtaining a weighing value for each of the marked important bits for each of the coefficients, wherein the sum of products of each of the weighing values and its corresponding threshold value equals to the corresponding coefficient;

(3C-2) setting the weighing values as refinement values for the important bits corresponding to the threshold value; and (3C-3) storing the refinement values corresponding to the threshold value in a refinement bit stream data storage unit.

8. The method of claim 4, wherein the first data bit stream comprises successive approximation quantization bit values.

9. The method of claim 5, wherein the second data bit stream comprises a symbol bit stream.

10. The method of claim 6, wherein the second data bit stream comprises a symbol bit stream.

11. The method of claim 6, wherein the third data bit stream comprises a simplified symbol bit stream.

12. The method of claim 7, wherein the third data bit stream comprises a simplified symbol bit stream.

13. The method of claim 4, wherein the data storage unit is one selected from the group consisting of a stack, a queue, and a register.

14. The method of claim 5, wherein the data storage unit is one selected from the group consisting of a stack, a queue, and a register.

15. The method of claim 6, wherein the data storage unit is one selected from the group consisting of a stack, a queue, and a register.

16. The method of claim 7, wherein the data storage unit is one selected from the group consisting of a stack, a queue, and a register.

* * * * *